(12) United States Patent
Matsuura

(10) Patent No.: US 7,735,869 B2
(45) Date of Patent: Jun. 15, 2010

(54) STRADDLE TYPE VEHICLE

(75) Inventor: Tatsuya Matsuura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 39 days.

(21) Appl. No.: 11/965,546

(22) Filed: Dec. 27, 2007

(65) Prior Publication Data
US 2009/0236840 A1 Sep. 24, 2009

Related U.S. Application Data

(60) Provisional application No. 60/949,571, filed on Jul. 13, 2007.

(51) Int. Cl.
*B62D 1/16* (2006.01)
(52) U.S. Cl. ..................................... 280/779
(58) Field of Classification Search .............. 280/779, 280/781, 785; 180/311, 312; 403/234, 164
See application file for complete search history.

(56) References Cited

U.S. PATENT DOCUMENTS

| 4,535,869 | A * | 8/1985 | Tsutsumikoshi et al. .... 180/311 |
| 4,667,765 | A * | 5/1987 | Tomoyuki ................... 180/311 |
| 6,412,856 | B1 * | 7/2002 | Kajikawa et al. ....... 296/203.01 |
| 6,523,634 | B1 * | 2/2003 | Gagnon et al. .............. 180/291 |
| 7,357,418 | B2 * | 4/2008 | Takahashi ................... 280/779 |
| 2004/0178619 | A1 | 9/2004 | Takahashi | |

FOREIGN PATENT DOCUMENTS

JP       2004-210080 A       7/2004

* cited by examiner

*Primary Examiner*—Faye M. Fleming
(74) *Attorney, Agent, or Firm*—Keating & Bennett, LLP

(57) ABSTRACT

A steering shaft supporting part 100 is connected to a pair of side frames 13 and 14 and extends substantially vertically to a steering shaft 12 in side view of a vehicle. An upper part of the steering shaft 12 is supported only on the steering shaft supporting part 100 so as to be freely rotatable and freely and vertically movable around an axial core of the steering shaft 12.

15 Claims, 8 Drawing Sheets

STRADDLE TYPE VEHICLE

This application claims priority from and incorporates by reference U.S. Provisional Patent Application Ser. No. 60/949,571 filed Jul. 13, 2007, entitled "Straddle Type Vehicle."

BACKGROUND OF THE INVENTION

1. Field of the Invention

The present invention relates to a straddle type vehicle comprising a steering shaft supporting part for supporting an upper part of a steering shaft.

2. Description of the Related Art

Up to now, known has been an all terrain vehicle (ATV) comprising a pair of right and left side frames forming a body frame and a steering shaft extending in a vertical direction between the pair of right and left side frames.

In such an all terrain vehicle, an upper part of the steering shaft is freely rotatably supported on a steering shaft supporting part mounted to a body frame, generally.

In such an all terrain vehicle, known has been a structure in which a steering shaft supporting part is fixed to two pipes bridged over two cross members connecting side frames for the purpose of firmly supporting an upper part of the steering shaft (refer to JP-A-2004-210080 (Page 5, FIG. 5), for example).

The above-mentioned steering shaft supporting part, however, has a complicated structure, and therefore, there has been a space for improvement in lightening weight and reducing costs.

In view of the above, an object of the invention is to provide a straddle type vehicle in which a steering shaft is firmly fixed with a simple structure.

SUMMARY OF THE INVENTION

A first aspect of the invention is a straddle type vehicle (an all terrain vehicle 1) comprising a vehicle frame (a vehicle frame 6), a steering shaft (a steering shaft 12) for mounting a handle (a bar handle 11) and a steering shaft supporting part (a steering shaft supporting part 100) for supporting the steering shaft, the straddle type vehicle wherein the vehicle frame includes a pair of side frames (side frames 13 and 14) provided respectively on the left and right sides of the vehicle, the pair of side frames extends in the length direction of the straddle type vehicle, the steering shaft extends in a vertical direction between the pair of side frames, the steering shaft supporting part is connected to the pair of side frames, the steering shaft supporting part extends substantially vertically to the steering shaft in side view of the straddle type vehicle, an upper part of the steering shaft is supported on the steering shaft supporting part so as to be freely rotatable and freely and vertically movable around an axial core of the steering shaft and the upper part of the steering shaft is supported only on the steering shaft supporting part.

The second aspect of the invention is the straddle type vehicle according to the first aspect of the invention, wherein the pair of side frames includes a pair of incline parts inclining downward to the front side of the straddle type vehicle.

The third aspect of the invention is the straddle type vehicle according to the second aspect of the invention, wherein the steering shaft supporting part is connected to the pair of side frames in side view of the straddle type vehicle and the steering shaft supporting part extends to the front of the straddle type vehicle from a place connected to the pair of side frames.

The fourth aspect of the invention is the straddle type vehicle according to the first aspect of the invention, wherein the steering shaft supporting part is formed straightly to the steering shaft from each of the pair of side frames.

The fifth aspect of the invention is the straddle type vehicle according to the first aspect of the invention, wherein the steering shaft supporting part is formed by bending a pipe member and the upper part of the steering shaft is supported on a bending part of the steering shaft supporting part.

The sixth aspect of the invention is the straddle type vehicle according to the first aspect of the invention, wherein an outer diameter (an outer diameter α) of the steering shaft supporting part is smaller than an outer diameter (an outer diameter β) of the pair of side frames.

The seventh aspect of the invention is the straddle type vehicle according to the first aspect of the invention, wherein the steering shaft supporting part further includes a lower part supporting part (a lower part supporting part 15) connected to the pair of side frames under a place of connection of the steering shaft supporting part and the pair of side frames, the lower part supporting part includes a supporting part (a supporting part 15a) extending to the rear side from a place connected to the pair of side frames, a lower part of the steering shaft is supported on the supporting part so as to freely rotatable around the axial core of the steering shaft.

The eighth aspect of the invention is the straddle type vehicle according to the first aspect of the invention, wherein the lower part of the steering shaft is supported so as to be freely rotatable around the axial core of the steering shaft in front of a place the steering shaft is supported on the steering shaft supporting part.

The ninth aspect of the invention is the straddle type vehicle according to the first aspect of the invention, comprising a fuel tank (a fuel tank 9) provided above the pair of side frames, wherein at least a part of the fuel tank is provided in an area (an area F) enclosed by the steering shaft, the steering shaft supporting part and the pair of side frames in side view of the straddle type vehicle.

BRIEF DESCRIPTION OF THE DRAWINGS

The invention will be described with reference to the accompanying drawings, wherein like numbers reference like elements, and wherein.

DESCRIPTION OF THE EMBODIMENTS

Figure 1:
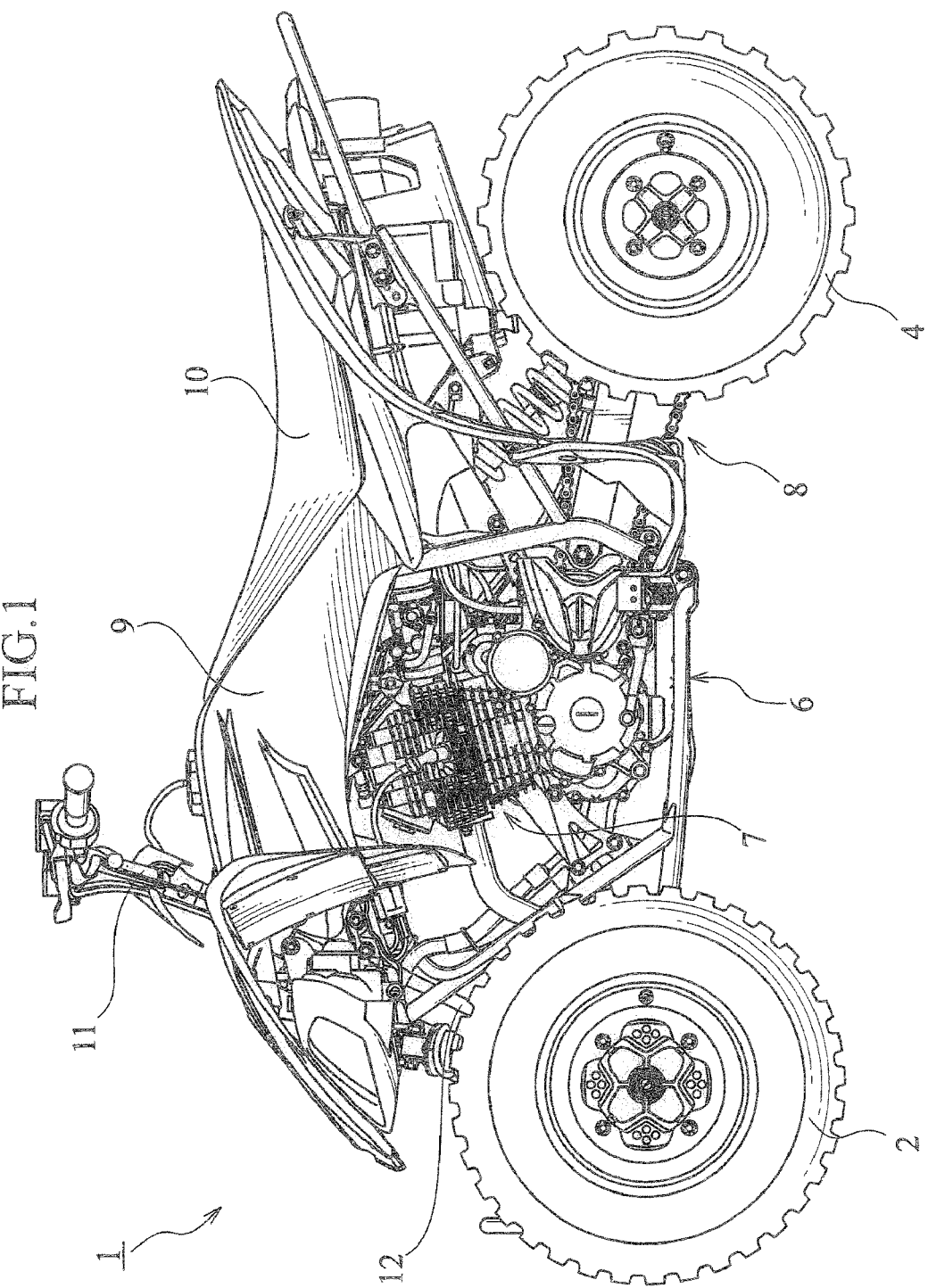
FIG. 1 is a left side view of an all terrain vehicle 1, which is a straddle type vehicle in accordance with an embodiment of the invention.

Now, a straddle type vehicle in accordance with embodiments of the invention will be described, made reference to the drawings. In the drawings, the same or similar parts in each of the drawings are identified by the same or similar reference numerals. It should be noted that the drawings are schematic, so that the proportions of the sizes are different from actual ones.

Thus, specific sizes should be determined in consideration of the following description. It should also be noted that the relationship and the proportions among the sizes in the drawing may also be different.

(Structure of Straddle Type Vehicle)

Figure 2:
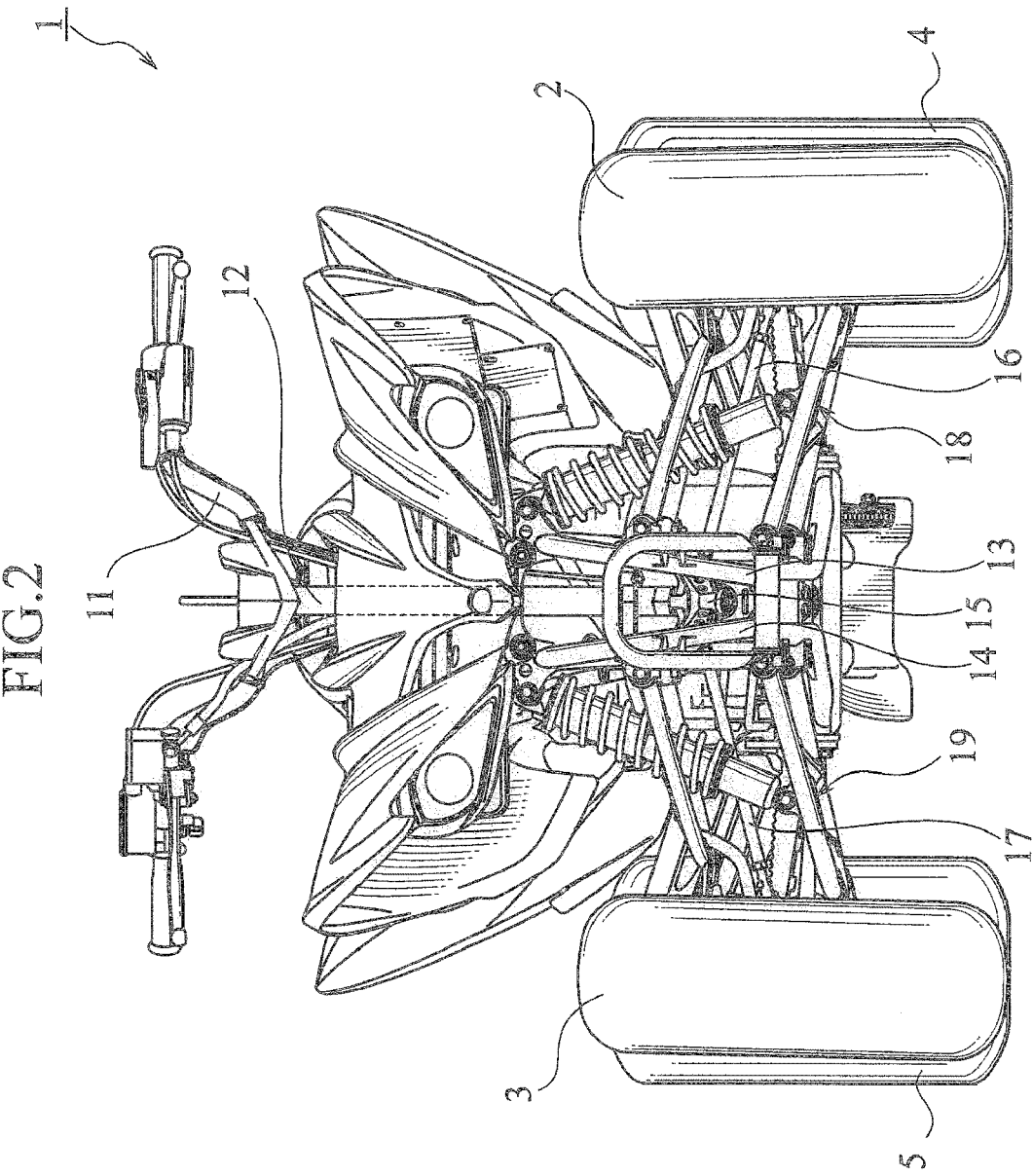
FIG. 2 is a front view of an all terrain vehicle 1, which is a straddle type vehicle in accordance with an embodiment of the invention.
Figure 3:
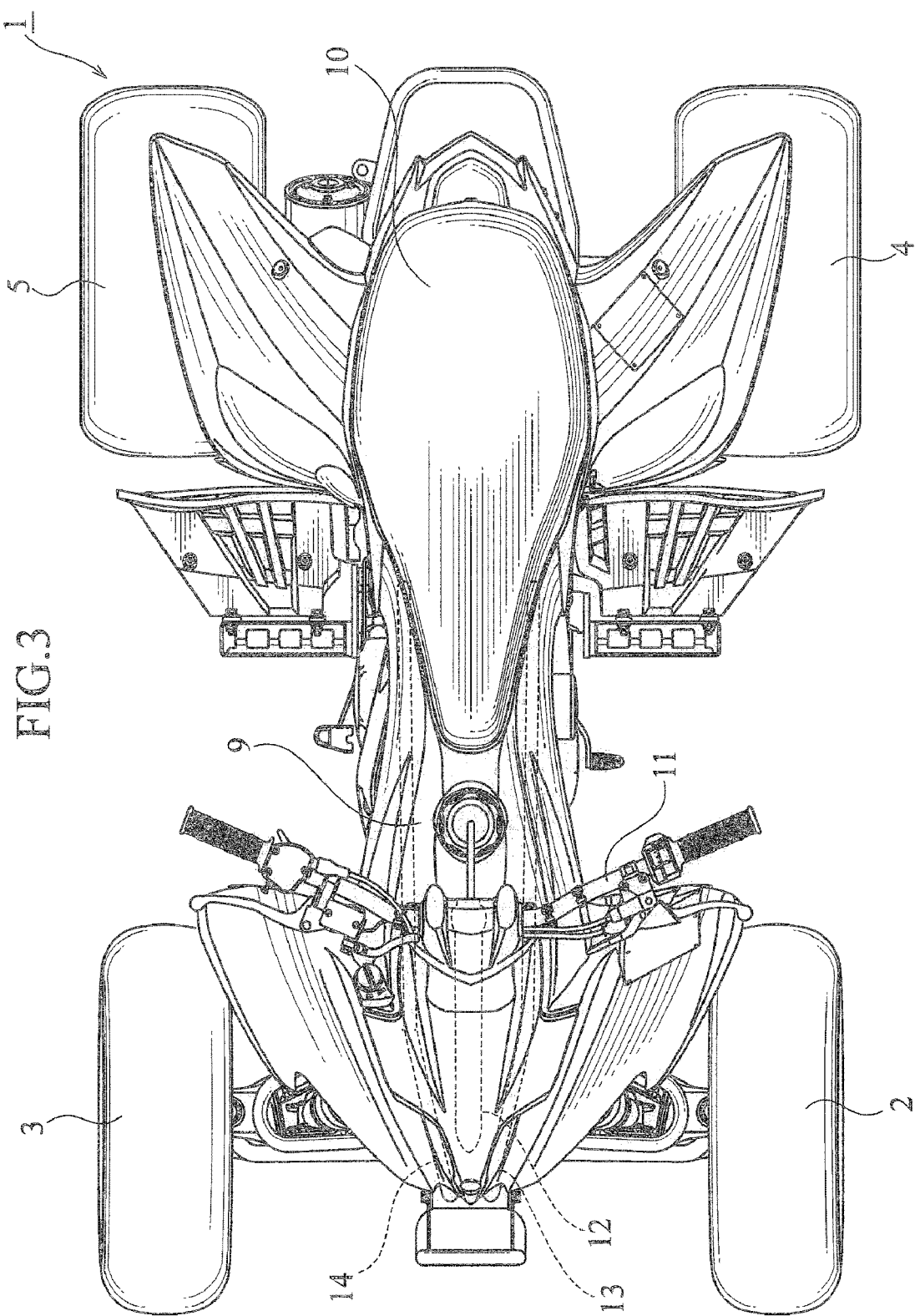
FIG. 3 is a plan view of an all terrain vehicle 1, which is a straddle type vehicle in accordance with an embodiment of the invention.

A straddle type vehicle in accordance with the embodiment is an all terrain vehicle 1. A schematic structure of the all terrain vehicle 1 in accordance with the embodiment will be described hereinafter, made reference to FIGS. 1 to 3. FIG. 1 is a left side view of the all-terrain vehicle 1. FIG. 2 is a front view of the all terrain vehicle 1. FIG. 3 is a plan view of the all terrain vehicle 1.

As shown in FIG. 1, the all terrain vehicle 1 comprises a pair of right and left front wheels 2 and 3, a pair of right and left rear wheels 4 and 5 and a body frame 6. Driving force generated by means of an engine unit 7 is transmitted to the rear wheels 4 and 5 through a transmission unit 8. The all terrain vehicle 1 also comprises a fuel tank 9 above the engine unit 7. In the rear of the fuel tank 9, provided is a seat 10 on which a rider sits.

As shown in FIG. 2, the all terrain vehicle 1 comprises a bar handle 11 and a steering shaft 12 for fixing the bar handle 11. The body frame 6 includes a pair of right and left side frames 13 and 14 in a vehicle width direction.

A rider operates the bar handle 11 so as to change a direction of the front wheels 2 and 3. The bar handle 11 is fixed to an upper end of the steering shaft 12.

The steering shaft 12 extends in a vertical direction between the pair of right and left side frames 13 and 14. A lower part of the steering shaft 12 is supported on a lower supporting part 15 so as to be freely rotatable around an axial core of the steering shaft 12. The lower supporting part 15 is fixed to the pair of right and left side frames 13 and 14.

The lower part of the steering shaft 12 is connected to the front wheels 2 and 3 through a pair of right and left tie rods 16 and 17. Further, the lower part of the steering shaft 12 is fixed in front of the upper part of the steering shaft 12, as shown in FIG. 3. A supporting structure of the lower part of the steering shaft 12 will be described later.

The pair of right and left side frames 13 and 14 extends in the length direction of the all terrain vehicle 1 in a plan view, as shown in FIG. 3. To a body frame 6 including the pair of right and left side frames 13 and 14, mounted is a pair of right and left suspension devices. In the embodiment described a double wishbone type suspension is used as the suspension device. Accordingly, the body frame 6 including the pair of right and left side frames 13 and 14 is provided with a pair of right and left double wishbone type suspensions 18 and 19. The pair of right and left front wheels 2 and 3 is suspended on the pair of right and left double wishbone type suspensions 18 and 19, respectively.

(Supporting Structure of Upper Part of Steering Shaft 12)

Figure 4:
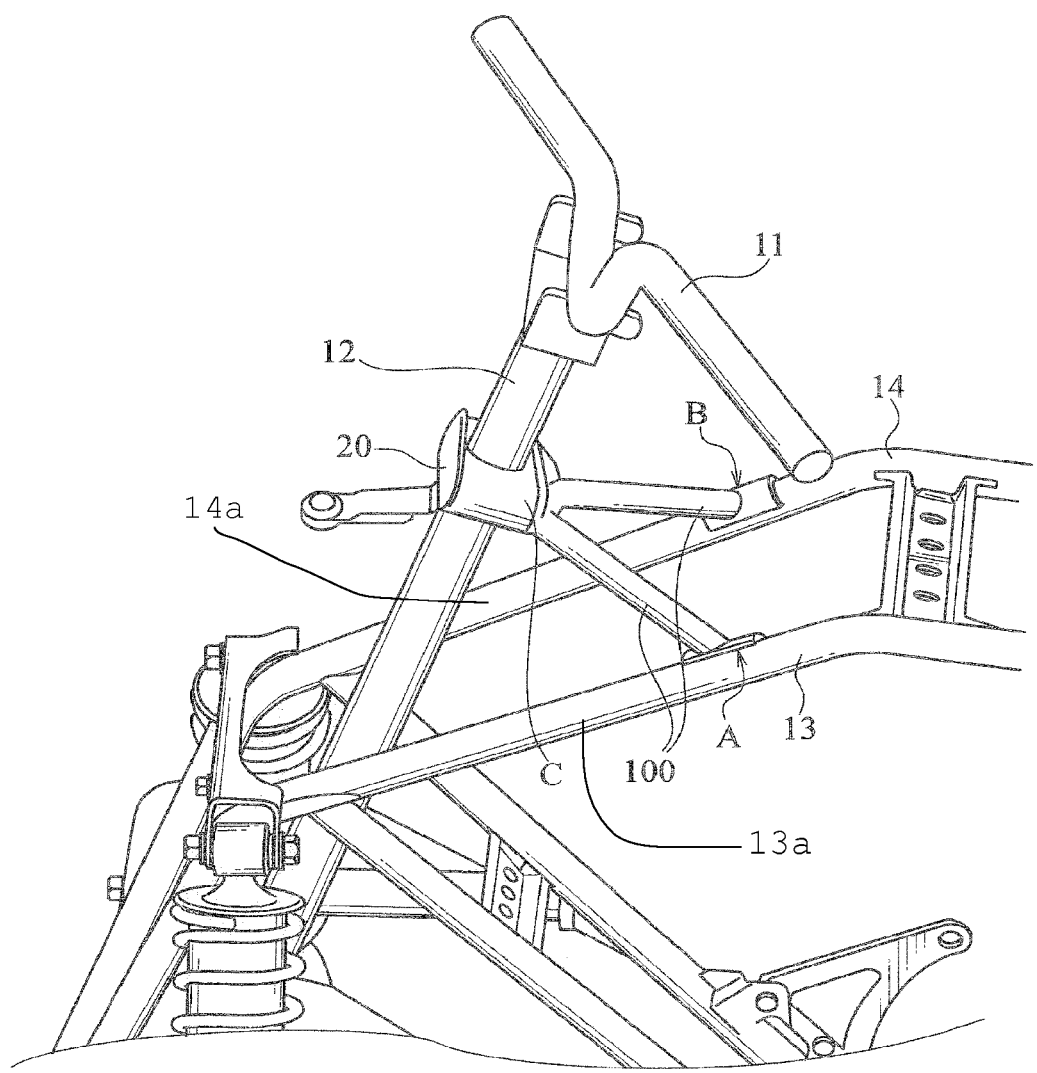
FIG. 4 is a perspective view of a supporting structure of an upper part of a steering shaft 12 in accordance with an embodiment of the invention.
Figure 5:
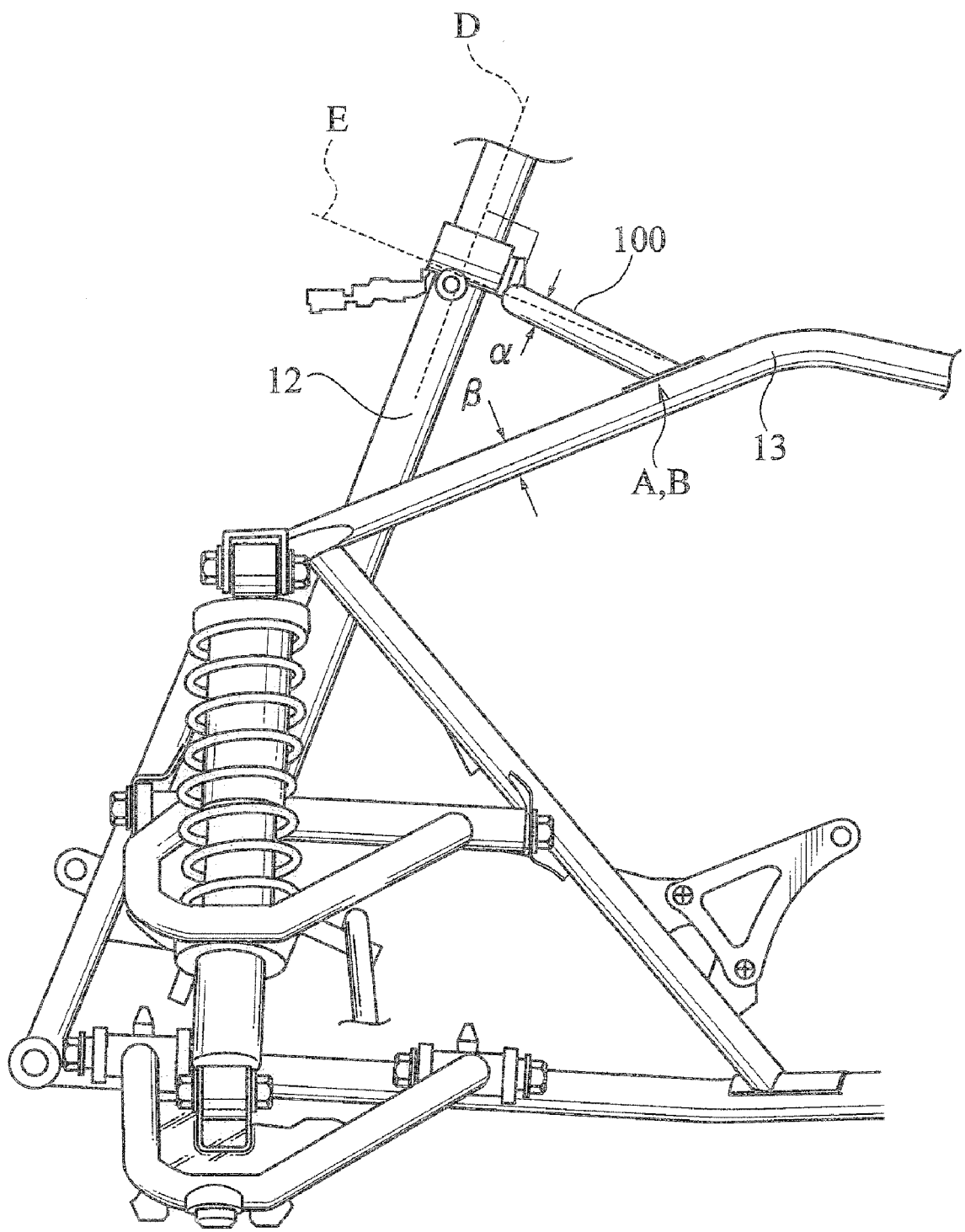
FIG. 5 is a left side view of a supporting structure of an upper part of a steering shaft 12 in accordance with an embodiment of the invention.

A supporting structure of the upper part of the steering shaft 12 will be described, made reference to FIGS. 4 and 5. FIG. 4 is a perspective view of the supporting structure of the upper part of the steering shaft 12. FIG. 5 is a left side view of the supporting structure of the upper part of the steering shaft 12.

The upper part of the steering shaft 12 is inserted in an annular member 20 so as to slidably pass through the annular member 20. The annular member 20 is connected to the steering shaft supporting part 100 as shown in FIG. 4. Accordingly, the upper part of the steering shaft 12 is supported on the steering shaft supporting part 100 so as to be freely rotatable and freely and vertically movable around the axial core of the steering shaft 12.

The steering shaft supporting part 100 is connected to each of the pair of right and left side frames 13 and 14. As shown in FIG. 4, the pair of right and left side frames 13 and 14 have a pair of right and left incline parts 13*a* and 14*a* inclining downward toward the front. The steering shaft supporting part 100 is connected to respective upper parts of the pair of right and left incline parts 13*a* and 14*a*. Moreover, the steering shaft supporting part 100 extends straightly from places respectively connected to the pair of right and left incline parts 13*a* and 14*a* toward the front.

The steering shaft supporting part 100 is formed from a pipe member, which is bent. The steering shaft supporting part 100 is connected to the annular member 20 at a bending part. Accordingly, the upper part of the steering shaft 12 is supported on the bending part of the steering shaft supporting part 100. Further, the upper part of the steering shaft 12 is supported only on the steering shaft supporting part 100 in all direction crossing at substantially right angles with the steering shaft 12.

As shown in FIG. 5, an outer diameter α of the steering shaft supporting part 100 is smaller than an outer diameters β of each of the pair of right and left side frames 13 and 14. The pair of right and left side frames 13 and 14 can be formed into the shape of a pipe or a column.

Moreover, as shown in FIG. 5, the steering shaft supporting part 100 extends in a substantially vertical direction with respect to the steering shaft 12 in side view of the all terrain vehicle 1. That is to say, a first reference line D along a direction that the steering shaft 12 extends crosses at substantially right angles with a second reference line E along a direction that the steering shaft supporting part 100 extends in side view of the all terrain vehicle 1.

(Supporting Structure of Lower Part of Steering Shaft 12)

Figure 6:
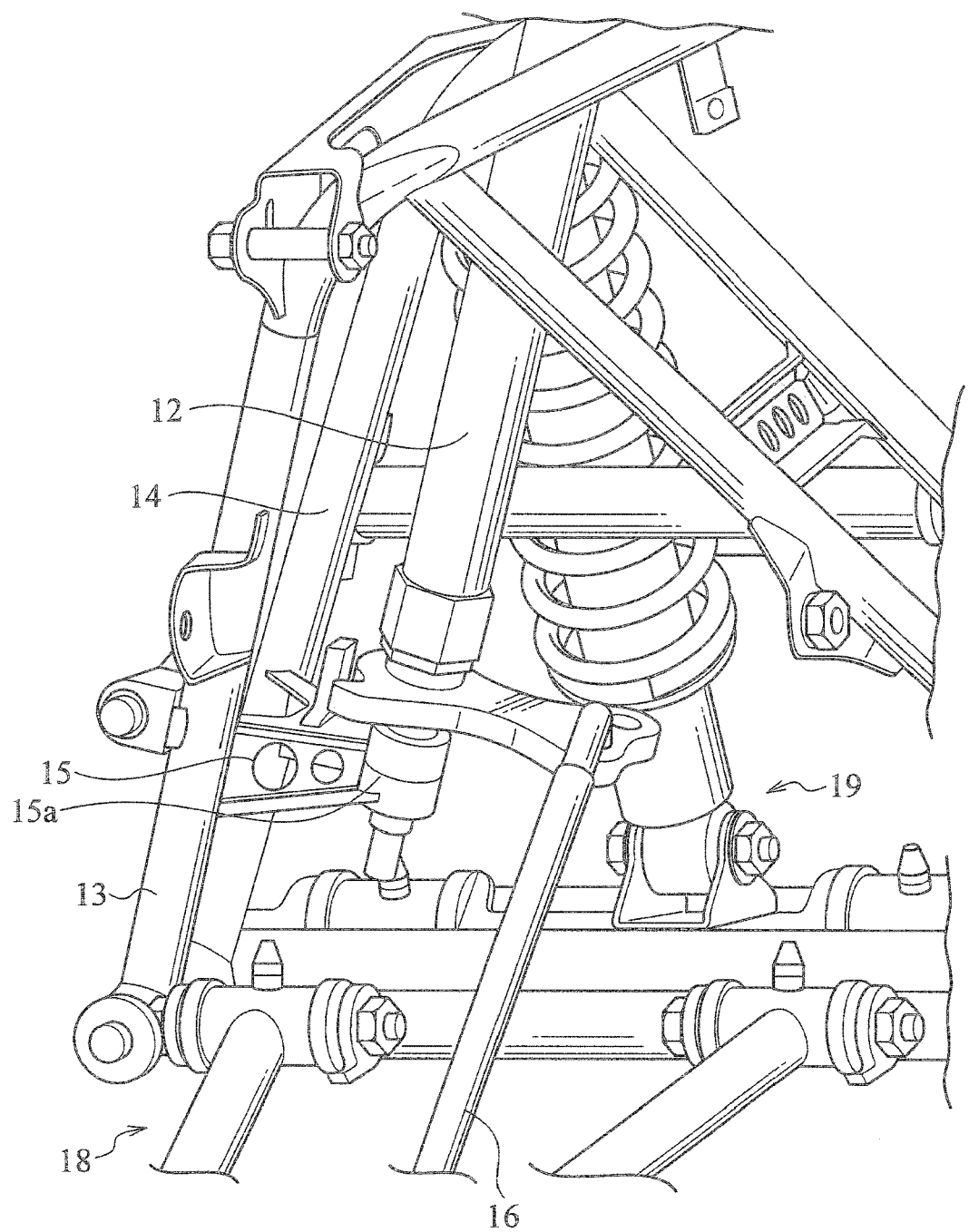
FIG. 6 is a left side view of a supporting structure of a lower part of a steering shaft 12 in accordance with an embodiment of the invention.

Now, described will be a supporting structure of the lower part of the steering shaft 12 with reference to FIG. 6. FIG. 6 is a left side view of the supporting structure of the lower part of the steering shaft 12. In FIG. 6, omitted are a suspension and an upper arm of the double wishbone type suspension 18 and the tie rod 17.

As described above, the lower part of the steering shaft 12 is supported on the lower supporting part 15 so as to be freely rotatable around the axial core of the steering shaft 12. Moreover, the lower part of the steering shaft 12 is supported in front of a place where the steering shaft 12 is supported on the steering shaft supporting part 100, as shown in FIG. 3.

As shown in FIG. 6, the lower part supporting part 15 is connected to the pair of side frames 13 and 14 under places place where the steering shaft supporting part 100 is connected to the pair of side frames 13 and 14.

The lower supporting part 15 has a supporting part 15*a* extending from places connected to the pair of side frames 13 and 14 toward the rear. Concretely, the lower part supporting part 15 is bent at a substantial center of the lower supporting part 15 in the vehicle width direction. The both ends of the lower supporting part 15 are connected to the pair of side frames 13 and 14. The lower supporting part 15 is provided so that the substantial center in the vehicle width direction would project toward the rear.

At a rear end part (the substantial center in th vehicle width direction) of the lower supporting part 15, provided is the supporting part 15a supporting the lower part of the steering shaft 12. The lower part of the steering shaft 12 is supported on the supporting part 15a so as to be freely rotatable around the axial core of the steering shaft 12.

(Supporting Place of Fuel Tank 9)

Figure 7:
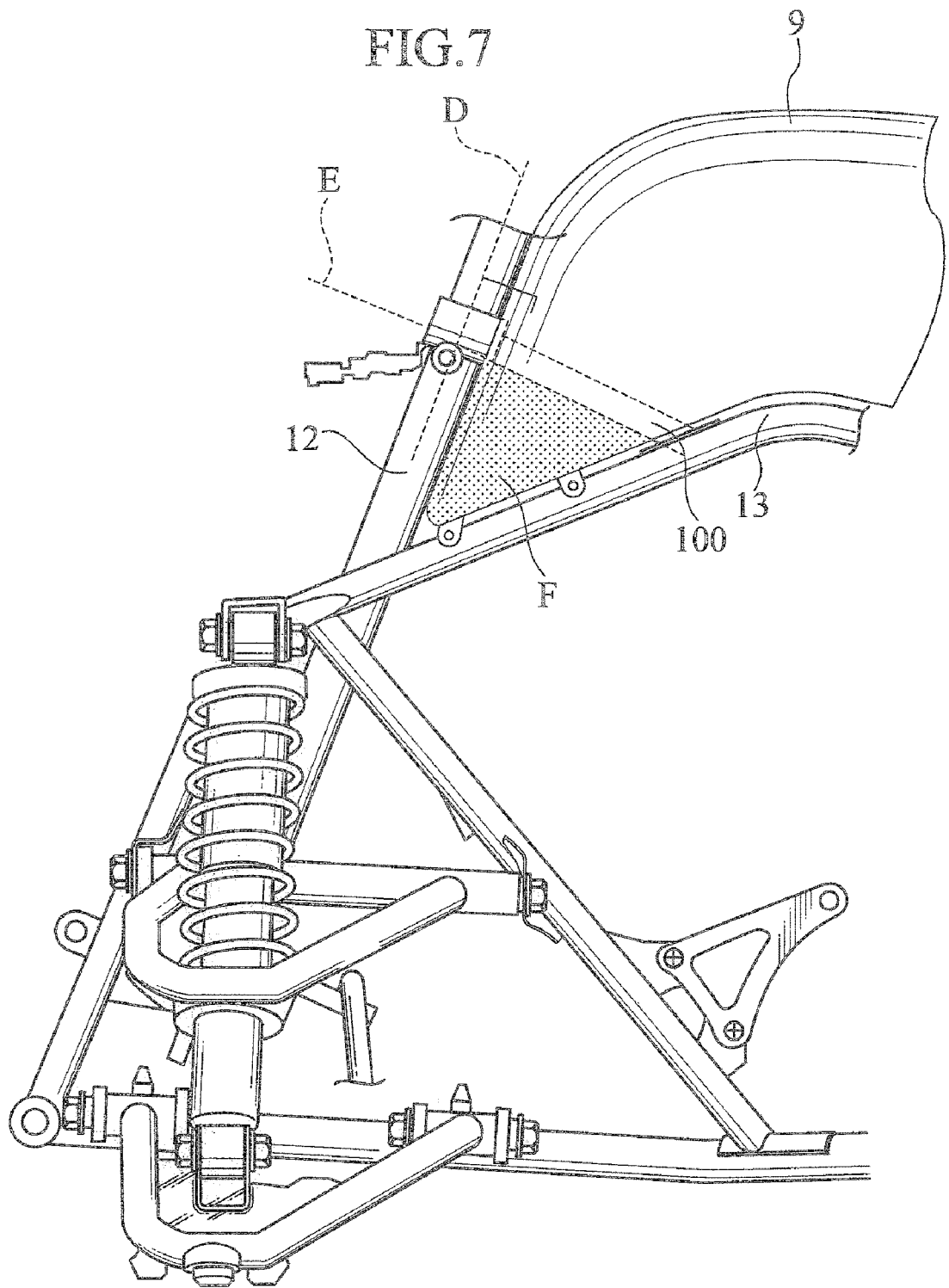
FIG. 7 is a left side view showing a supporting place of a fuel tank 9 in accordance with an embodiment of the invention.

FIG. 7 is a side view of a supporting structure of the fuel tank 9. The fuel tank 9 is provided above the pair of right and left side frames 13 and 14. The fuel tank 9 is also provided so as to cover an upper surface and side surfaces of the steering shaft supporting part 100. Concretely, a part of the fuel tank 9 is provided in an area F enclosed by the steering shaft 12, the steering shaft supporting part 100 and the pair of right and left side frames 13 and 14 in side view of the all terrain vehicle 1, as show in FIG. 7.

Further, the fuel tank 9 is supported on the pair of right and left side frames 13 and 14 (the pair of right and left incline parts 13a and 14a) in front of a place where the steering shaft supporting part 100 is connected to the pair of right and left side frames 13 and 14.

(Operation and Effect)

The steering shaft supporting part 100 in accordance with the embodiment is connected to the pair of side frames 13 and 14 and extends substantially vertically to the steering shaft 12 in side view of the vehicle. The upper part of the steering shaft 12 is supported only on the steering shaft supporting part 100 so as to be freely rotatable and freely and vertically movable around the axial core of the steering shaft 12.

As described above, the steering shaft supporting part 100 allows the upper part of the second steering shaft 12 to be movable along the axial core of the steering shaft 12 in the vertical direction. Accordingly, no load is added to the steering shaft supporting part 100 in a direction along the axial core. Moreover, the steering shaft supporting part 100 is provided in a direction substantially vertical with respect to the steering shaft 12. This causes only a load in a direction crossing at right angles with the direction along the axial core of the steering shaft 12 to be added to the steering shaft supporting part 100.

Accordingly, the steering shaft supporting part 100 is only required to have the strength capable of bearing a load in a direction crossing at substantially right angles with the axial core of the steering shaft 12. This results in a simple structure in which the steering shaft 12 is supported only on the steering shaft supporting part 100.

In the embodiment, the pair of right and left side frames 13 and 14 includes the pair of right and left incline parts 13a and 14a inclining downward to the front side while the steering shaft supporting part 100 is connected to the pair of right and left incline parts 13a and 14a.

The pair of right and left side frames 13 and 14 thus incline downward toward the front, so that the pair of right and left side frames 13 and 14 is connected to the steering shaft supporting part 100 at a predetermined angle. This enables a load added to the pair of right and left side frames 13 and 14 from the steering shaft 12 through the steering shaft supporting part 100 to be more effectively received by the pair of right and left side frames 13 and 14.

Furthermore, the steering shaft supporting part 100 is formed straightly from the places connected to the pair of right and left side frames 13 and 14 to the steering shaft 12 in the embodiment.

Accordingly, in the case that the fuel tank 9 is provided so as to cover the upper surface and the side surfaces of the steering shaft supporting part 100, the fuel tank 9 can be formed so that the capacity would be expanded outside the steering shaft supporting part 100 in the vehicle width direction.

Moreover, in the embodiment, a pipe member is bent to form the steering shaft supporting part 100. This allows the steering shaft supporting part 100 to be simply produced, using a light member.

In addition, the upper part of the steering shaft 12 is supported at a bending part of the steering shaft supporting part 100 in the embodiment. The steering shaft supporting part 100 is also connected to the pair of right and left side frames 13 and 14.

Accordingly, a load added from the steering shaft 12 to the steering shaft supporting part 100 can be evenly dispersed on the both sides of the bending part of the steering shaft supporting part 100. This results in more firm support of the steering shaft 12 on the steering shaft supporting part 100.

In the embodiment, the outer diameter $\alpha$ of the steering shaft supporting part 100 is smaller than the outer diameter $\beta$ of each of the pair of right and left side frames 13 and 14. This allows the vehicle to be lightened and the manufacturing costs to be reduced. Even in this case, however, the steering shaft supporting part 100 can bear the load in the direction crossing at right angles with the axial core direction of the steering shaft 12.

Further, in the embodiment, the lower part of the steering shaft 12 is connected to the pair of side frames under places where the steering shaft supporting part 100 is connected to the pair of side frames 13 and 14. The lower part supporting part 15 supports the lower part of the steering shaft 12 at a supporting part 15a extending to the rear side from places connected to the pair of side frames 13 and 14. As described above, the lower part supporting part 15 can be shortened in length since the lower part supporting part 15 is directly connected to the pair of side frames 13 and 14. This allows the rigidity of the lower part supporting part 15 to be improved while lightening of a vehicle and a reduction in manufacturing costs can be achieved.

Moreover, in the embodiment, the lower part of the steering shaft 12 is supported in front of a place where the steering shaft 12 is supported on the steering shaft supporting part 100. That is to say, the steering shaft 12 extends downward to the front side while the steering shaft supporting part 100 connected vertically to the steering shaft 12 extends downward to the rear side. This causes a distance between the steering shaft 12 and the pair of right and left side frames 13 and 14 to be shortened, so that the length of the steering shaft supporting part 100 can be designed to be short. As a result, the rigidity of the steering shaft supporting part 100 can be improved.

Furthermore, in the embodiment, the fuel tank 9 is provided in the area F enclosed by the steering shaft 12, the steering shaft supporting part 100 and the pair of right and left side frames 13 and 14 in side view of the all terrain vehicle 1. This allows the capacity of the fuel tank 9 to be expanded.

Other Embodiments

Contents of the invention have been disclosed through an embodiment of the invention as described above. The description and drawings, which form a part of the disclosure, however, should not be considered as a limitation of the invention. The disclosure will reveal various kinds of alternative embodiments for a person skilled in the art.

Figure 8:
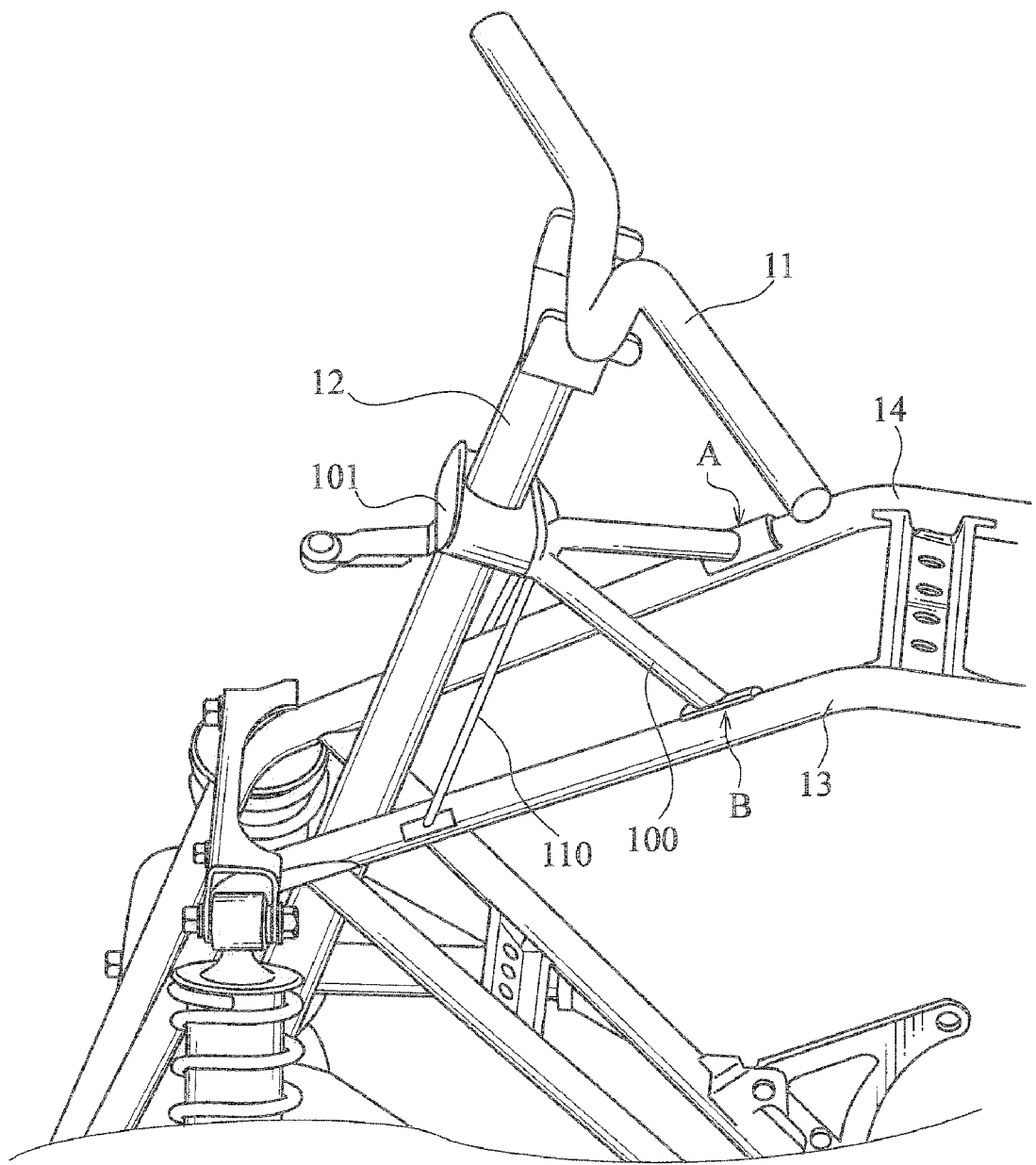
FIG. 8 is a left side view of a supporting structure of an upper part of a steering shaft 12 in accordance with another embodiment of the invention.

For example, the steering shaft 12 is supported only on the steering shaft supporting part 100 in the above embodiment. A member 110 making substantially no contribution to support of the steering shaft 12, however, may be provided between the steering shaft supporting part 100 and the pair of right and left side frames 13 and 14, as shown in FIG. 8. Accordingly, a sentence of "the steering shaft 12 is supported only on the steering shaft supporting part 100" in the embodiment includes a case that a member making substantially no contribution to support of the steering shaft 12 is added.

In addition, the embodiment has been described as an example of the all terrain vehicle 1. An effect of the invention, however, can be achieved so long as the vehicle is a straddle type vehicle comprising a pair of right and left side frames and a steering shaft.

Moreover, a pipe-shaped member is bent to form the steering shaft supporting part 100 in the above embodiment. The steering shaft supporting part 100, however, may be formed by means of a column-shaped member. The shape of the steering shaft supporting part 100 in a plan view of the all terrain vehicle 1 is also not limited. The steering shaft supporting part 100 may be curved. Further, the steering shaft supporting part 100 may be formed from plural members connected to each other.

As described above, it goes without saying that the invention includes various kinds of embodiments not described above. Accordingly, matters specific to the invention in accordance with Claims, which are proper from the above description, only defines a technical range of the invention.

What is claimed is:

1. A straddle type vehicle comprising:
   a vehicle frame;
   a steering shaft for mounting a handle; and
   a steering shaft supporting part arranged to support the steering shaft; wherein
   the vehicle frame includes a pair of side frames provided respectively on the left and right sides of the vehicle;
   the pair of side frames extend in a length direction of the vehicle;
   the steering shaft extends in a substantially vertical direction between the pair of side frames;
   the steering shaft supporting part is connected to the pair of side frames;
   the steering shaft supporting part extends perpendicular to the steering shaft in a side view of the straddle type vehicle;
   an upper part of the steering shaft is supported on the steering shaft supporting part so as to be freely rotatable around and freely and vertically movable along an axial core of the steering shaft; and
   the upper part of the steering shaft is supported only on the steering shaft supporting part.

2. The straddle type vehicle according to claim 1, wherein the pair of side frames includes a pair of inclined parts inclining downward to a front side of the straddle type vehicle.

3. The straddle type vehicle according to claim 2, wherein:
   the steering shaft supporting part is connected to the pair of inclined parts in a side view of the straddle type vehicle; and
   the steering shaft supporting part extends to the front side of the straddle type vehicle from a location where the steering shaft supporting part is connected to the pair of inclined parts.

4. The straddle type vehicle according to claim 1, wherein:
   the steering shaft supporting part extends straightly to the steering shaft from each of the pair of side frames.

5. The straddle type vehicle according to claim 1, wherein:
   the steering shaft supporting part is a bent pipe member; and
   the upper part of the steering shaft is supported at a bent portion of the steering shaft supporting part.

6. The straddle type vehicle according to claim 1, wherein an outer diameter of the steering shaft supporting part is smaller than an outer diameter of the pair of side frames.

7. The straddle type vehicle according to claim 1, wherein:
   the steering shaft supporting part further includes a lower part supporting part connected to the pair of side frames under a place of connection of the steering shaft supporting part and the pair of side frames;
   the lower part supporting part includes a supporting part extending rearwardly from a location where the lower part supporting part is connected to the pair of side frames; and
   a lower part of the steering shaft is supported on the supporting part so as to be freely rotatable around the axial core of the steering shaft.

8. The straddle type vehicle according to claim 1, wherein a lower part of the steering shaft is supported so as to be freely rotatable around the axial core of the steering shaft in front of a location where the steering shaft is supported on the steering shaft supporting part.

9. The straddle type vehicle according to claim 1, further comprising:
   a fuel tank provided above the pair of side frames, wherein at least a part of the fuel tank is provided in an area enclosed by the steering shaft, the steering shaft supporting part, and the pair of side frames in the side view of the straddle type vehicle.

10. The straddle type vehicle according to claim 1, wherein the steering shaft supporting part includes a pair of pipe members extending from the pair of side frames, respectively, and the pair of pipe members define two sides of a triangle having an apex substantially coincident with the steering shaft.

11. The straddle type vehicle according to claim 1, wherein the steering shaft supporting part extends directly from the pair of side frames.

12. The straddle type vehicle according to claim 1, wherein the steering shaft supporting part includes a first pipe member and a second pipe member, the first pipe member extending directly from a first one of the pair of side frames and the second pipe member extending directly from a second one of the pair of side frames.

13. The straddle type vehicle according to claim 1, wherein the steering shaft supporting part includes a first pipe member and a second pipe member, the first pipe member extending directly from a first one of the pair of side frames toward the steering shaft and the second pipe member extending directly from a second one of the pair of side frames toward the steering shaft.

14. The straddle type vehicle according to claim 1, further comprising an annular member connected to the steering shaft supporting part, the annular member arranged to support the upper part of the steering shaft so as to be freely rotatable around and freely and vertically movable along an axial core of the steering shaft.

15. The straddle type vehicle according to claim 14, wherein the steering shaft supporting part includes a first pipe member and a second pipe member, the first pipe member extending directly from a first one of the pair of side frames to the annular member and the second pipe member extending directly from a second one of the pair of side frames to the annular member.

* * * * *